United States Patent
Yilmaz et al.

(10) Patent No.: US 10,152,673 B2
(45) Date of Patent: Dec. 11, 2018

(54) METHOD FOR PSEUDO-RECURRENT PROCESSING OF DATA USING A FEEDFORWARD NEURAL NETWORK ARCHITECTURE

(71) Applicant: ASELSAN ELEKTRONIK SANAYI VE TICARET ANONIM SIRKETI, Ankara (TR)

(72) Inventors: Ozgur Yilmaz, Ankara (TR); Huseyin Ozkan, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 622 days.

(21) Appl. No.: 14/900,177

(22) PCT Filed: Jun. 21, 2013

(86) PCT No.: PCT/IB2013/055112
§ 371 (c)(1),
(2) Date: Dec. 21, 2015

(87) PCT Pub. No.: WO2014/203042
PCT Pub. Date: Dec. 24, 2014

(65) Prior Publication Data
US 2016/0140434 A1    May 19, 2016

(51) Int. Cl.
*G06K 9/62* (2006.01)
*G06N 3/04* (2006.01)
*G06N 3/063* (2006.01)

(52) U.S. Cl.
CPC ......... *G06N 3/0454* (2013.01); *G06N 3/0445* (2013.01); *G06N 3/063* (2013.01); *G06K 9/6218* (2013.01); *G06K 9/6223* (2013.01)

(58) Field of Classification Search
None
See application file for complete search history.

(56) References Cited

U.S. PATENT DOCUMENTS 5,060,278 A * 10/1991 Fukumizu ............ G06K 9/6281
382/157
5,956,702 A *  9/1999 Matsuoka .............. G06N 3/049
704/250

(Continued)

OTHER PUBLICATIONS

French, Selective Memory Loss in Aphasics: An Insight from Pseudo-recurrent Connectionist Networks, Connectionist Representations (1997) at pp. 183-195 (Year: 1997).*

(Continued)

*Primary Examiner* — Christian Chace
*Assistant Examiner* — Negel G. Ray
(74) *Attorney, Agent, or Firm* — Gokalp Bayramoglu

(57) ABSTRACT

Recurrent neural networks are powerful tools for handling incomplete data problems in machine learning thanks to their significant generative capabilities. However, the computational demand for algorithms to work in real time applications requires specialized hardware and software solutions. We disclose a method for adding recurrent processing capabilities into a feedforward network without sacrificing much from computational efficiency. We assume a mixture model and generate samples of the last hidden layer according to the class decisions of the output layer, modify the hidden layer activity using the samples, and propagate to lower layers. For an incomplete data problem, the iterative procedure emulates feedforward-feedback loop, filling-in the missing hidden layer activity with meaningful representations.

2 Claims, 1 Drawing Sheet

(56) References Cited

U.S. PATENT DOCUMENTS

| | | |
|---|---|---|
| 7,346,208 B2 | 3/2008 | Staelin et al. |
| 2012/0136896 A1 | 5/2012 | Tseng et al. |
| 2013/0036082 A1 | 2/2013 | Natarajan et al. |

OTHER PUBLICATIONS

Specht, A General Regression Neural Network, Transactions on Neural Networks, vol. 2 (1991) at pp. 568-576 (Year: 1991).*

Yoon & Lee, Training Algorithm with Incomplete Data for Feed-Forward Neural Networks, Neural Processing Letters vol. 10 at pp. 171-179 (1999) (Year: 1999).*

Bengio et al., Recurrent Neural Networks for Missing or Asynchronous Data, Advances in Neural Information Processing Systems vol. 8 at pp. 395-401 (1995) (Year: 1995).*

Salakhutdinov & Hinton, An Efficient Learning Procedure for Deep Boltzman Machines, Neural Computation vol. 24 at 1967-2000 (Aug. 2012) (Year: 2012).*

Johnson, J.S. and Olshausen, B.A. (2005). The recognition of partially visible natural objects in the presence and absence of their occluders. Vision Research, 45, 3262-3276.

Chechik, G., Heitz, G., Elidan, G., Abbeel, P. and Koller, D. (2007). Max-Margin Classification of Data with Absent Features. Journal of Machine Learning Research, 9, 127.

Marlin, B. (2008). Missing Data Problems in Machine Learning. PhD thesis, University of Toronto.

Marlin, B. M., Zemel, R.S., Rowels, S.T. and Slaney, M. (2011). Recommender Systems: Missing Data and Statistical Model Estimation. Proceedings of the International Joint Conference on Artificial Intelligence.

Smolensky, P. (1986). Information Processing in Dynamical Systems: Foundations of Harmony Theory. In Rumelhart, David E.; McLelland, James L. Parallel Distributed Processing: Explorations in the Microstructure of Cognition, vol. 1: Foundations. MIT Press. pp. 194-281.

Dempster, A. P., Laird, N.M., Rubin, D. B. (1977). Maximum Likelihood from Incomplete Data via the EM Algorithm. Journal of the Royal Statistical Society, SeriesB 39(1), 1-38.

Coates, A., Lee, H. and A.Y. Ng. (2011) An analysis of single-layer networks in unsupervised feature learning. Proceeding of the International Conference on AI and Statistics.

Krizhevsky, A. (2009). Learning multiple layers of features from Tiny Images. Master's thesis, Dept. of Comp. Sci., University of Toronto.

Siegelmann, H., and Sontag, E. (1995). On the computational power of neural nets. J. Comput. Systems Sci., 50, 132-150.

Funahashi, K., and Nakamura, Y. (1993) Approximation of dynamical systems by continuous time recurrent neural networks. Neural Networks. 6. 801-806.

Bengio, Y.. Simard, P., and Frasconi, P. (1994). Learning long-term dependencies with gradient descent is difficult. IEEE T. Neural Networks., 5(2).

Hochreiter S., Schmidhuber, J. (1997). Long short-term memory. Neural Computation, 9, 1735-1780.

Doya, K. (1992). Bifurcations in the learning of recurrent neural networks. Proceedings of IEEE International Symposium on Circuits and Systems, 6, 2777-2780.

Martens, J., and Sutskever, I. (2011). Learning recurrent neural Networks with Hessian-free optimization. Proceedings of International Conference on Machine Learning.

Maass, W., Natschlager, T., and Markram, H. (2002). Real-time computing without stable states: a new framework for neural computation based on perturbations. Neural Computation, 14(11), 2531-2560.

Jaeger, H. (2001). The echo state approach to analysing and training recurrent neural networks. Technical Report GMD Report 148. German National Research Center for Information Technology.

Hinton, G.E. and Salakhutdinov, R. (2006). Reducing the dimensionality of data with neurral networks. Science. 313(5786). 504-507.

Wang, C., Liao, X., Carin, L., Dunson, D.B. (2010). Classification with Incomplete Data Using Dirichlet Process Priors. Journal of Machine Learning Research, 11, 3269-3311.

Schafer, J., & Graham, J. (2002). Missing data: Our view of the state of the art. Psychological Methods. 7, 147-177.

Ghahramani, Z. and Jordan, M.I. (1994). Supervised learning from incomplete data via an EM approach. Advances in Neural Information Processing Systems. 6. 120-127.

Metropolis, N., Rosenbluth, A.W., Rosenbluth, M.N., Teller, A.H., and Teller, E. (1953). Equation of state calculations by fast computing machines. Journal of Chemical Physics,21, 1087-1092.

Hopfield, J. (1982). Neural networks and physical systems with emergent collective computational abilities. Proceedings of the National Academy of Science, USA, 79.

Seung, S.H. (1998). Learning continuous attractors in recurrent networks. In M.I. Jordan, M.J. Kearns, and S.A.Solla, editors, Advances in Neural Information Processing Systems 10(NIPS'97), pp. 654-660. MIT Press.

Jain, V. and Seung S.H. (2008). Natural image denoising with convolutional networks. In Daphne Koller, Dale Schuurmans, Yoshua Bengio, and Leon Bottou, editors, Advances in Neural Information Processing Systems 21 (NIPS'08).

Vincent; P., Larochelle, H., Lajoie; I., Bengio, Y., Manzagol, P.A. (2010). Stacked Denoising Autoencoders: Learning Useful Representations in a Deep Network with a Local Denoising Criterion. Journal of Machine Learning Research, 11, 3371-3408.

Besag. J. (1975). Statistical analysis of non-lattice data. The Statistician, 24(3), 179-195, 1975.

Heckerman, D., Chickering, D.M., Meek, C., Rounthwaite, R. and Kadie, C. (2000). Dependency networks for inference, collaborative filtering, and data visualization, Journal of Machine Learning Research, 1, 49-75.

Roelof K. Brouwer et al: "Training a feed-forward network with incomplete data due to missing input variables", Applied Soft Computing, vol. 3, No. 1, (Jul. 1, 2003), pp. 23-36, XP055106182, ISSN: 1568-4946, DOI: 10.1016/S1568-4946(03) 00003-6 p. 23-p. 35, right-hand column, paragraph2.

36, XP055106182, ISSN: 1568-4946, DOI: 10.1016/S1568-4946(03) 0003-6 p. 23-p. 35, right-hand column, paragraph2.

* cited by examiner

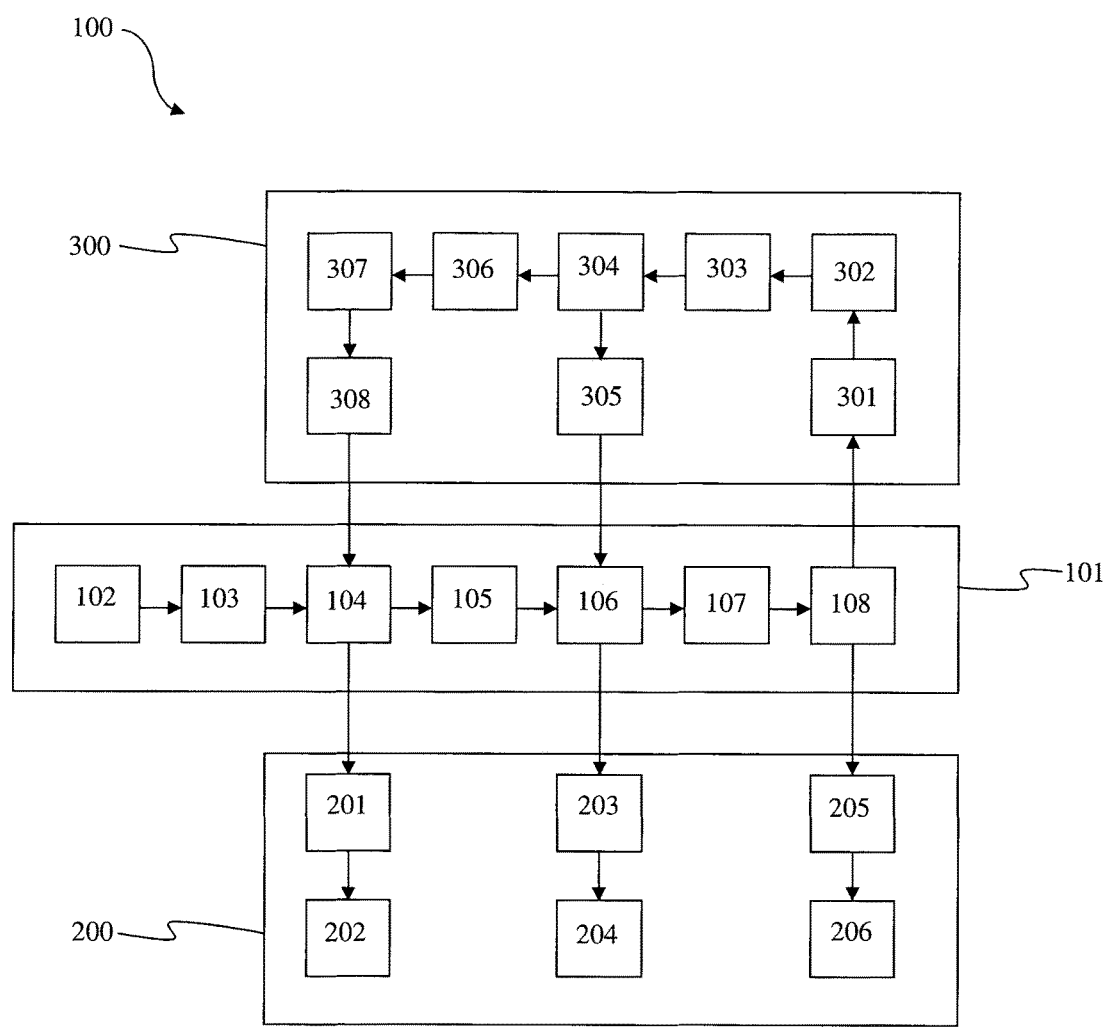

METHOD FOR PSEUDO-RECURRENT PROCESSING OF DATA USING A FEEDFORWARD NEURAL NETWORK ARCHITECTURE

FIELD OF THE INVENTION

The present invention relates to method for implementing a recurrent neural network algorithm.

BACKGROUND OF THE INVENTION

Classification of incomplete data is an important problem in machine learning that has been previously tackled from both the biological and computational perspectives. The proposed solutions to this problem are closely tied to the literature on inference with incomplete data, generative models for classification problems and recurrent neural networks.

Recurrent Neural Networks (RNNs) are connectionist computational models that utilize distributed representation and nonlinear dynamics of its units. Information in RNNs is propagated and processed in time through the states of its hidden units, which make them appropriate tools for sequential information processing. There are two broad types of RNNs: stochastic energy based RNNs with symmetric connections, and deterministic ones with directed connections.

RNNs are known to be Turing complete computational models and universal approximators of dynamical systems. They are especially powerful tools in dealing with the long-range statistical relationships in a wide variety of applications ranging from natural language processing, to financial data analysis. Additionally, RNNs are shown to be very successful generative models for data completion tasks.

Despite their immense potential as universal computers, difficulties in training RNNs arise due to the inherent difficulty of learning long-term dependencies and convergence issues. However, recent advances suggest promising approaches in overcoming these issues, such as using better nonlinear optimizers or utilizing a reservoir of coupled oscillators. Nevertheless, RNNs remain to be computationally expensive in both the training as well as the test phases. The idea in the disclosed method of this patent is, to imitate recurrent processing in a network and exploit its power while avoiding the expensive energy minimization in training, or computationally heavy sampling in test. Generative models are used to randomly generate observable data, using the learnt probabilistic structure encoded in its hidden variables. In contrast to the discriminative models, generative models specify a joint probability distribution over the observed data and the corresponding class labels. For an example, Restricted Boltzmann Machines are generative RNN models. Mixture models are perhaps the most widely used generative tools and Expectation Maximization has become the standard technique for estimating the corresponding statistical parameters, i.e., the parameters of a mixture of subpopulations in the training data. Given the parameters of subpopulation distributions, new data can be generated through sampling methods.

Classification under incomplete data conditions is a well studied problem. Imputation is commonly used as a pre-processing tool, before the standard classification algorithms are applied. The Mixture of Factor Analyzer approach assumes multiple clusters in the data, estimates the statistical parameters of these clusters and uses them for filling-in the missing feature dimensions. Thus, in imputation stage, the missing feature values are filled-in with sampled values from a pre-computed distribution. Here, multiple imputation assumes that the data come from a mixture of distributions, and is capable of capturing variation in the data. Sampling from a mixture of factor analyzers and filling-in the data is effectively very similar to the feedback information insertion in a neural network from a higher layer of neurons onto a lower layer of neurons.

Previously, both feedforward and recurrent neural network methods were proposed for denoising of images, i.e. recovering original images from corrupted versions. Multi-layer perceptrons were trained using backpropagation for denoising tasks, as an alternative to energy based undirected recurrent neural networks Hopfield models). Recurrent neural networks were trained for denoising of images, by forming continuous attractors. A convolutional neural network was employed which takes an image as input and outputs the denoised image. The weights of the convolutional layers were learned through backpropagation of reconstruction error. Denoising was used as a means to design a better autoencoder recurrent neural network. Pseudo-likelihood and dependency network approaches solve data completion problem by learning conditional distributions that predict a data component using the rest of the components. These two approaches show similarities to the method disclosed in this patent, due to the maximum likelihood estimation approach of the missing data components, i.e. k-means clustering and imputation of cluster center. However, none of the prior art propose an iterative procedure that roots from a high level class decision at the backend of a neural network and propagates this information back into the network for choosing the optimum sample, in a maximum likelihood sense from a mixture of distributions. Patent discloses a method for imputing unknown data components in a data structure using statistical methods. Tensor factorization method is used in patent to perform multiple imputation in retail sales data. Neural network method is disclosed in patent to denoise images that are compressed and decompressed.

OBJECTS OF THE INVENTION

The object of the invention is a method for implementing a recurrent data processing. The disclosed method, based on mixture models and multiple imputation, is applied onto a specific neural network's hidden layer activities. The disclosed multiple imputation approach can be considered as a pseudo-recurrent processing in the network as if it is governed by the dynamical equations of the corresponding hidden layer activities. This framework provides a shortcut into the recurrent neural network computation, which is suitable for real-time operation. The disclosed method successfully performs classification for incomplete data in which the missing data components are completely unknown or some of the data components are largely distorted.

BRIEF DESCRIPTION OF THE DRAWING

FIG. 1 schematically shows the connecting diagram of the present invention.

DETAILED DESCRIPTION OF THE INVENTION

Recent work on feedforward networks has proven the importance of dense sampling and number of the hidden layer units. The question is how a successful feedforward network can be transformed into a computationally not so intense pseudo-recurrent one, with occlusion/incomplete data handling capability. In the disclosed method, Coates et al.'s network is adopted and modified to fill-in incomplete (occluded) visual representations (hidden layer activities). The nonlinear dynamical equations to construct the attractors in the high dimensional space are replaced with linear distance comparators. And costly sampling operations such as MCMC are replaced with averaging and binary decision operations. In Hopfield networks and Boltzmann machines, "hidden memories" are interpretations of the sensory input, and they are formed by iterative energy minimization procedures. In our algorithm, hidden memories are formed using K-means clustering and linear filtering.

In a recurrent network, the hidden layer activity at time t is given as a function (parameterized over θ) of the hidden layer activity at t−1 and the current input as $$h^t = F_\theta h^{t-1}, x^t.$$

In leaky integration approach, t<t−1, activity is added for smoother changes, $$h^t = \gamma h^{t-1} + (1-\gamma) F_\theta(h^{t-1}, x^t).$$

In our framework, for computational efficiency, $F_\theta$ is replaced with $H^t$ i.e., $$h^t = \gamma h^{t-1} + (1-\gamma) H^t,$$

where $H^t$ is the cluster center, which is the minimum distance cluster center to the previous hidden layer activity $h^{t-1}$, $$H^t = \mathrm{argmin}_k (h^{t-1} - {}_\gamma{}^k \overline{H})^2.$$

Here, $\overline{H}$ is the set of the cluster centers, having K2 number of clusters for each class. The closest cluster center $H^t$ computation is based on the previous decision on the class label using support vector machines (SVM). Therefore, the network uses its class decision to narrow down the set of candidate probability distributions for sampling hidden layer activity. Therefore, high level information is used to sample hidden layer activity that is merged with the current hidden layer activity. Repeating this procedure in a loop emulates the behavior of a dynamical system, i.e. RNN.

The disclosed method (100) comprises of, a feedforward neural network (101), training stage (200) for forming memories in hidden layers, and test stage (300) for exploiting memories in data completion tasks. In 101, network architecture is shown as that:
- it has one hidden layer 104, which performs Analysis (103) or dimensionality expansion on the presented multi-dimensional data (102)
- a subsequent hidden layer (106) computed by Pooling (105) the first hidden layer's activities in separate spatial regions (eg. quadrants in images)
- an SVM mimics the output layer of the network and performs multi-class Classification (107) on Layer 2 activity, and outputs class label (108).

For details of the feedforward network method, [9] should be visited.

During the training phase, a set of data (102) with known labels are used for training classifiers (205). There are 3 stages that are introduced for pseudo-recurrent processing:
4. Filter and Store (201): The first and second hidden layer activities of every training input data is low pass filtered and stored in data structures, called hidden layer memories (202):

$$\dot{H}_1 = \{h_1^1, h_1^2, h_1^2 \ldots h_1^N\}, \text{ for N training examples and Layer 1.}$$

$$\dot{H}_2 = \{h_2^1, h_2^2, h_2^2 \ldots h_2^N\}, \text{ for N training examples and Layer 2.}$$

5. K-Means Clustering (203): Memory formation in an RNN through costly energy minimization is replaced with clustering. The second hidden layer activities (106) are vectorized and clustered using K-means with K2 number of clusters per class or K2*(# of Classes) number of clusters for non-class specific processing (cf. section 3.1.3). Therefore the hidden layer activities of each class are quantized into K2 bins, or the hidden layer activities of the whole data is quantized into K2*(# of Classes) number of bins. Hidden Layer 2 memory (204):

$$\overline{H}_2^y = \{h_2^1, h_2^2, h_2^3 \ldots h_2^{K2}\}, K2 \text{ cluster centers for each class } y \text{ or}$$

$$\overline{H}_2 = \{h_2^1, h_2^2, h_2^3 \ldots h_2^{C \times K2}\}, K2^*(\text{\# of Classes}) \text{ cluster centers for the whole data.}$$

6. Multi-Hypotheses SVM Training (205): In an RNN, multiple hypotheses can form and compete with each other to explain sensory data. A cascaded, multi hypotheses classification framework is constructed to imitate this feature. The training is repeated for a subset of data in order to allow multiple hypotheses of the network. This is achieved by excluding a specific single class (eg. Class 1) or a pair of classes (eg. Class 1 and Class 2), and training an SVM for the rest of the data. In the case of single class exclusion, the trained SVM can be used for supplying a second hypothesis. For example, if Class 1 is the first choice of the network that is decided by the "full SVM classifier", the classifier trained by leaving out Class 1 data is used to give a second hypothesis. In the case of a pair of class exclusions, for example both Class 1 and Class 2 data are left out, the trained SVM gives a third hypothesis, where the first choice is Class 1 and the second choice is Class 2. This collection of classifiers is used during test, to decide which cluster centers of hidden Layer 2 activities will be used for feedback insertion. The classifier memory (206) consists of:
S is the SVM classifier for the first choice of the network
$S^p$ is the SVM classifier for the second choice when the first choice was class p.
$S^{pq}$ is the SVM classifier for the third choice when the first choice was class p and second q.

During test phase an unknown labeled and possibly incomplete (i.e. occluded, sub-sampled etc.) test data instance (102) is presented. The test phase has following iterative stages for recurrent processing:
8. Pooling (105): Test phase starts with the algorithm provided by Coates et al. [9] and computes hidden Layer 2 activity (106) via pooling Layer 1 activity (104). For test data instance i, at time=t:

$$h_2^{i,t} = P(h_1^{i,t}),$$

where P is the pooling operation (105) over hidden Layer 1 (104) activity.
9. Multi-Hypotheses SVM Testing (301): First, second and third class label choices of the network are extracted using the corresponding SVM in the classifier memory (206). The multiple hypotheses (302) of the system are:

$$y^1 = S(h_2^{i,t})$$

where S( ) is the classification operation (107) and $y^1$ is the class label of the first choice.

$y^2=S^{y^1}(h_2^{i,t})$ and $y^3=S^{y^1,y^2}(h_2^{i,t})$.

10. Cluster Selection (303): For each class hypothesis, the cluster centers in the hidden Layer 2 memory (204) which are closest (Euclidian distance) to the test data hidden Layer 2 activity (106) are computed. These are hidden layer hypotheses of the network. 3 cluster centers (one for each class hypothesis) that are closest to the test data instance Layer 2 activity (106) are computed as follows:

$\tilde{h}_{2,1}^{i,t}=\mathrm{argmin}_k(h_2^{i,t}-\overline{H}_2^{y^2,k})^2$, the first class hypothesis cluster center, $\tilde{h}_{2,2}^{i,t}=\mathrm{argmin}_k(h_2^{i,t}-\overline{H}_2^{y^2,k})^2$, the second class hypothesis cluster center, $\tilde{h}_{2,3}^{i,t}=\mathrm{argmin}_k(h_2^{i,t}-\overline{H}_2^{y^3,k})^2$, and third class hypothesis cluster center.

In a "winner-takes-all" configuration, the closest of the clusters (min distance to the test hidden layer activity) computed above is chosen as the Layer 2 hidden activity sample (304), and for the "average" configuration, the average of the three clusters is assigned as the sample (304):

$\tilde{h}_{2,A}^{i,t}=\mathrm{argmin}_m(\tilde{h}_{2,m}^{i,t}-h_2^{i,t})$ assigned Layer 2 sample for "winner-takes-all".

$$\tilde{h}_{2,A}^{i,t} = \frac{1}{m}\sum_1^m (\tilde{h}_{2,m}^{i,t})$$

assigned Layer 2 sample for "average" scheme.

For non-class specific configuration, instead of computing 3 closest centers for each of the class hypotheses, 3 closest clusters are computed regardless of class hypotheses. Another set of hidden Layer 2 memory (see training phase, stage 203) is used:

$\tilde{h}_{2,A}^{i,t}=\mathrm{argmin}_k(h_2^{i,t}-\overline{H}_2^{k})^2$.

11. Feedback (305, Layer 2): The Layer 2 sample is merged (feedback magnitude, $\alpha$) with the test data instance Layer 2 activity (106), to generate hidden layer activity at time t+1

$h_2^{i,t+1}=(h_2^{i,t}+\alpha\tilde{h}_{2,A}^{i,t})/(1+\alpha)$. (109)

12. Layer 1 Sampling (306): The modified hidden Layer 2 activity (109) is used to compute the most similar training set data instance, using the Euclidean distance.

$L^{i,t}=\mathrm{argmin}_k(h_2^{i,t+1}-\dot{H}_2^k)$, is the index of the most similar training data. The hidden Layer 1 activity of the most similar training data is fetched from the Layer 1 memory (202), as the Layer 1 sample (307) of the network:

$\tilde{h}_{1,A}^{i,t}=\dot{H}_1^L$.

13. Feedback (308 Layer 1): The Layer 1 sample (307) is merged (feedback magnitude $\beta$) with the test data instance Layer 1 activity (104), to generate hidden layer activity at time t+1.

$h_1^{i,t+1}=(h_1^{i,t}+\beta\tilde{h}_{1,A}^{i,t})/(1+\beta)$. (110)

14. Pooling (105, second run): Modified Layer 1 activity (110) is pooled (105) to compute the most recent Layer 2 activity (111) in the iterative loop. Then, this activity is averaged (feedback ratio, $\tau$) with previously computed Layer 2 activity (109) coming from Layer 2 feedback (305). The updated Layer 2 activity (112) with feedback is:

$h_2^{i,t+1}:=[h_2^{i,t+1}+\tau P(h_1^{i,t+1})]/(1+\tau)$. (309)

Update rule (309) for the Layer 2 activity (112) can be rewritten using the references in FIG. 1 and text as:

(112):=[(109)+$\tau$(111)]/[1+$\tau$]

This procedure is repeated for multiple iterations starting from the second stage (301) and output Layer 2 activity (112). The feedback magnitude is halved at each iteration. for simulated annealing purposes.

The perspective adopted in the disclosed method binds three distinct approaches to the data generation: RNNs, mixture models and incomplete data classification. An intuitive and real-time operable method is disclosed. Imputation and mixture of factor analyzers in the disclosed method are used as a part of the pseudo-recurrent processing. In the method disclosed in this patent, a feedforward neural network makes a class decision at its output layer and selects an appropriate cluster to estimate selected model's hidden layer activities. After this sampling stage, the algorithm inserts the cluster center as if it is a feedback from a higher layer. As opposed to the case in classical imputation technique, in our network, the incomplete hidden layer activities can't be isolated due. to spatial pooling, thus it is assumed that the missing dimensions are not known a priori. Since the missing data dimensions are unknown, the sample and the test data hidden layer activities are merged in all dimensions. This procedure is repeated multiple times to emulate the feedforward-feedback iterations in an RNN. Other related concepts such as multi-hypotheses feedback and winner-takes-all are also applied. We suggest this method as a shortcut into feedback processing and a baseline for the performance of RNNs in data completion tasks.

The invention claimed is:

1. A computer implemented method for recurrent data processing, comprising the steps of:
   computing activity of multiple layers of hidden layer nodes in a feed forward neural network, given an input data instance,
   forming memories of hidden layer activities, utilizing clustering and filtering methods, as a training phase in a recurrent processing,
   finding memories that are closest to a presented test data instance according to a class decision of the feedforward network, and imputing the test data hidden layer activity with computed closest memories in an iterative fashion,
   wherein the step of forming memories of hidden layer activities, utilizing clustering and filtering methods, as a training phase in a recurrent processing further comprises the substeps of:
      computing hidden layer activities of every training data instance, then low-pass filtering and stacking the hidden layer activities in a data structure;
      keeping a first and second hidden layer activity memory, indexed by class label;
      forming both class specific and class independent cluster centers as quantized memories of the training data's second hidden layer activity, via k-means clustering, using each class data separately or using all the data together depending on a choice of class specificity;

keeping quantized second hidden layer memories, indexed by class labels or non-indexed, depending on the class specificity choice;

training a cascade of classifiers for enabling multiple hypotheses generation of a network, via utilizing a subset of the input data as the training data; and keeping a classifier memory, indexed with the set of data used during training;

wherein the step of finding memories that are closest to the presented test data instance according to the class decision of the feed forward network, and imputing the test data hidden layer activity with computed closest memories in an iterative fashion further comprises the substeps of:

determining first, second and third class label choices of the neural network as multiple hypotheses, via a cascaded procedure utilizing a sequence of classifier decisions;

computing a set of candidate samples for the second layer, that are closest Euclidian distance hidden layer memories to the test data's second hidden layer activity, using the multiple hypotheses class decisions of the network and a corresponding memory database then assigning the second hidden layer sample as one of the candidate hidden layer memories, via max or averaging operations depending on a choice of multi-hypotheses competition;

merging the second hidden layer sample with the test data's second hidden layer activity via weighted averaging operation, creating an updated second hidden layer activity;

using the updated second hidden layer activity to compute the closest Euclidian distance first hidden layer memory, and assigning as the first hidden layer sample, merging the first hidden layer sample with the test data first hidden layer activity via weighted averaging operation, creating an updated first hidden layer activity;

computing the feedforward second hidden layer activity from updated first hidden layer activity, and merging this feed-forward second hidden layer activity with updated second hidden layer activity, via weighted averaging operation; and repeating these steps for multiple iterations starting from the step of determining the first, second and third class label choices of the neural network as multiple hypotheses, via a cascaded procedure utilizing a sequence of classifier decisions, and using the output of step of computing the feedforward second hidden layer activity from updated first hidden layer activity, and merging this feed forward second hidden layer activity with updated second hidden layer activity, via weighted averaging operation in the beginning of the next iteration.

2. A computer implemented method according to claim 1 for enabling a feedforward network to mimic a recurrent neural network via making a class decision at the output layer of feedforward neural network, and selecting an appropriate memory to estimate hidden layer activities, then inserting the selected memory to the hidden layer activity as if the selected memory is a feedback from a higher layer network in classical recurrent networks.

* * * * *